US008107438B1

(12) United States Patent
Singh et al.

(10) Patent No.: US 8,107,438 B1
(45) Date of Patent: Jan. 31, 2012

(54) METHOD FOR INITIATING HANDOFF OF A WIRELESS ACCESS TERMINAL BASED ON THE REVERSE ACTIVITY BIT

(75) Inventors: Anil Singh, Overland Park, KS (US); Ashish Bhan, Shawnee, KS (US); Jason Sigg, Olathe, KS (US); Jasinder P. Singh, Olathe, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 808 days.

(21) Appl. No.: 12/141,569

(22) Filed: Jun. 18, 2008

(51) Int. Cl.
 *H04W 4/00* (2009.01)
(52) U.S. Cl. .................................................. 370/332
(58) Field of Classification Search .................. None
 See application file for complete search history.

(56) References Cited

U.S. PATENT DOCUMENTS

| | | | |
|---|---|---|---|
| 5,649,299 A | 7/1997 | Battin et al. | |
| 5,995,923 A | 11/1999 | Mermelstein et al. | |
| 6,021,328 A | 2/2000 | Curtis et al. | |
| 6,148,207 A * | 11/2000 | Baum et al. | 455/442 |
| 6,172,974 B1 | 1/2001 | Tseng et al. | |
| 6,243,590 B1 | 6/2001 | Reddy et al. | |
| 6,272,358 B1 | 8/2001 | Brent et al. | |
| 6,418,147 B1 | 7/2002 | Wiedeman | |
| 6,480,541 B1 | 11/2002 | Girod et al. | |
| 6,501,736 B1 | 12/2002 | Smolik et al. | |
| 6,591,110 B1 | 7/2003 | Kim et al. | |
| 6,606,496 B1 | 8/2003 | Salvarani et al. | |
| RE38,244 E | 9/2003 | Han et al. | |
| 6,625,119 B1 | 9/2003 | Schuster et al. | |
| 6,718,183 B1 | 4/2004 | Blust et al. | |
| 6,757,520 B2 | 6/2004 | Attar et al. | |
| 6,839,356 B2 | 1/2005 | Barany et al. | |
| 6,856,954 B1 | 2/2005 | Su | |
| 6,980,523 B1 | 12/2005 | Lipford et al. | |
| 7,058,124 B2 | 6/2006 | Koo | |
| 7,099,283 B2 | 8/2006 | Matta et al. | |
| 7,120,447 B1 | 10/2006 | Chheda et al. | |
| 7,130,311 B2 | 10/2006 | Yavuz et al. | |

(Continued)

FOREIGN PATENT DOCUMENTS

WO WO 2004/004249 1/2004

(Continued)

OTHER PUBLICATIONS

First Action Interview Pilot Program Pre-Interview Communication from U.S. Appl. No. 11/746,229, mailed Dec. 30, 2009.

(Continued)

*Primary Examiner* — Chirag Shah
*Assistant Examiner* — Amar Persaud

(57) ABSTRACT

Methods are disclosed for initiating a handoff of a wireless access terminal based on a set of one or more factors including the determined value of the Reverse Activity Bit (RAB). The set of one or more factors may also further include (i) a determined round-trip delay for a bi-directional communications link between the first wireless access node and the wireless access terminal, wherein the bi-directional communications link comprises a forward link from the first wireless access node to the wireless access terminal and a reverse link from the wireless access terminal to the first wireless access node, and/or (ii) a determined forward-link signal-strength indicator for a forward link from the first wireless access node to the wireless access terminal.

24 Claims, 5 Drawing Sheets

U.S. PATENT DOCUMENTS

| | | | |
|---|---|---|---|
| 7,142,562 | B2 | 11/2006 | Yavuz et al. |
| 7,245,915 | B2 | 7/2007 | Matta et al. |
| 7,328,027 | B1 | 2/2008 | Mangal |
| 7,406,319 | B2 | 7/2008 | Kostic et al. |
| 7,411,923 | B2 | 8/2008 | Attar et al. |
| 7,411,974 | B2 | 8/2008 | Attar et al. |
| 7,426,180 | B2 | 9/2008 | Xu |
| 7,426,395 | B2 | 9/2008 | Stephens |
| 7,440,431 | B2 | 10/2008 | Sindhushayana et al. |
| 7,474,627 | B2 | 1/2009 | Chheda et al. |
| 7,486,645 | B2 | 2/2009 | Li et al. |
| 2002/0061749 | A1* | 5/2002 | Hunzinger .................. 455/436 |
| 2002/0191693 | A1 | 12/2002 | Nakagaki |
| 2003/0064741 | A1 | 4/2003 | Silva et al. |
| 2003/0095551 | A1 | 5/2003 | Gotoh et al. |
| 2003/0117956 | A1 | 6/2003 | Lee |
| 2003/0129982 | A1* | 7/2003 | Perini ......................... 455/442 |
| 2003/0195006 | A1 | 10/2003 | Choong et al. |
| 2004/0017860 | A1 | 1/2004 | Liu |
| 2004/0037291 | A1 | 2/2004 | Attar et al. |
| 2004/0057420 | A1 | 3/2004 | Curcio et al. |
| 2004/0109424 | A1* | 6/2004 | Chheda ........................ 370/331 |
| 2004/0196852 | A1 | 10/2004 | Aksu et al. |
| 2004/0218533 | A1 | 11/2004 | Kim et al. |
| 2005/0032522 | A1 | 2/2005 | Soong et al. |
| 2005/0052996 | A1 | 3/2005 | Houck et al. |
| 2005/0153695 | A1* | 7/2005 | Cho ............................ 455/436 |
| 2005/0286440 | A1 | 12/2005 | Strutt et al. |
| 2006/0077994 | A1 | 4/2006 | Spindola et al. |
| 2006/0092880 | A1* | 5/2006 | Nounin et al. ............... 370/331 |
| 2006/0159045 | A1* | 7/2006 | Ananthaiyer et al. ....... 370/329 |
| 2006/0182062 | A1* | 8/2006 | Sdralia et al. ............... 370/331 |
| 2006/0205436 | A1* | 9/2006 | Liu et al. .................... 455/560 |
| 2006/0250953 | A1 | 11/2006 | Mooney |
| 2006/0252429 | A1 | 11/2006 | Chen et al. |
| 2006/0291383 | A1 | 12/2006 | Bi et al. |
| 2007/0060165 | A1 | 3/2007 | Black et al. |
| 2007/0109967 | A1 | 5/2007 | Ha |
| 2007/0177510 | A1 | 8/2007 | Natarajan et al. |
| 2007/0242702 | A1 | 10/2007 | Shim |
| 2008/0008093 | A1 | 1/2008 | Wang et al. |
| 2008/0049706 | A1 | 2/2008 | Khandekar et al. |
| 2008/0080414 | A1 | 4/2008 | Thubert et al. |
| 2008/0130495 | A1 | 6/2008 | Dos Remedios et al. |
| 2008/0137614 | A1* | 6/2008 | Kwon et al. ................. 370/331 |
| 2008/0186846 | A1 | 8/2008 | Stephenson et al. |
| 2008/0247450 | A1 | 10/2008 | Alexander et al. |
| 2008/0280615 | A1* | 11/2008 | Vinayakray-Jani ........... 455/437 |
| 2009/0086629 | A1 | 4/2009 | Zhang et al. |
| 2009/0141683 | A1* | 6/2009 | Grinshpun et al. ........... 370/331 |
| 2009/0170547 | A1 | 7/2009 | Raghothaman et al. |
| 2009/0257361 | A1 | 10/2009 | Deshpande et al. |
| 2009/0285159 | A1 | 11/2009 | Rezaiifar |
| 2010/0296407 | A1 | 11/2010 | Medvedev et al. |
| 2010/0309861 | A1 | 12/2010 | Gorokhov et al. |

FOREIGN PATENT DOCUMENTS

| | | |
|---|---|---|
| WO | WO 2004/004249 A1 | 1/2004 |
| WO | 2004/028095 | 4/2004 |

OTHER PUBLICATIONS

U.S. Appl. No. 11/746,229, filed May 9, 2007 entitled "Using VoIP-Quality Metrics to Dynamically Adjust the EV-DO Reverse Activity Bit".

U.S. Appl. No. 12/350,694, filed Jan. 8, 2009 entitled "Using Packet-Transport Metrics for Call-Admission Control".

U.S. Appl. No. 12/397,855, filed Mar. 4, 2009 entitled "Using Packet-Transport Metrics for Setting DRCLocks".

U.S. Appl. No. 12/432,736, filed Apr. 29, 2009 entitled "Using DRCLocks for Conducting Call Admission Control".

U.S. Appl. No. 12/494,999, filed Jun. 30, 2009 entitled "Implementing Quality of Service (QoS) by Using Hybrid ARQ (HARQ) Response for Triggering the EV-DO Reverse Activity Bit (RAB)".

U.S. Appl. No. 12/507,913, filed Jul. 23, 2009 entitled "Achieving Quality of Service (QoS) by Using the Reverse Activity Bit (RAB) in Creation of Neighbor Lists for Selected Access Terminals".

Pre-Interview Communication mailed on Dec. 30, 2009 in U.S. Appl. No. 11/746,229.

First Action Interview Summary mailed on Jun. 2, 2010 in U.S. Appl. No. 11/746,229.

Notice of Allowance mailed on Aug. 3, 2010 in U.S. Appl. No. 11/746,229.

Non-Final Office Action mailed on Oct. 12, 2010 in U.S. Appl. No. 12/397,855.

Final Office Action mailed on Apr. 1, 2011 in U.S. Appl. No. 12/397,855.

Non-Final Office Action mailed on Jun. 22, 2010 in U.S. Appl. No. 12/350,694.

Final Office Action mailed on Dec. 9, 2010 in U.S. Appl. No. 12/350,694.

Non-Final Office Action mailed on Feb. 18, 2011 in U.S. Appl. No. 12/350,694.

Notice of Allowance mailed on Jun. 10, 2011 in U.S. Appl. No. 12/350,694.

U.S. Appl. No. 12/388,199, filed Feb. 18, 2009.

U.S. Appl. No. 12/478,318, filed Jun. 4, 2009.

U.S. Appl. No. 12/538,624, filed Aug. 10, 1999.

U.S. Appl. No. 12/756,629, filed Apr. 8, 2010.

U.S. Appl. No. 12/731,895, filed Mar. 25, 2010.

U.S. Appl. No. 11/746,229, Interview Summary dated Apr. 6, 2010.

U.S. Appl. No. 12/388,199, Non-Final Office Action dated Mar. 30, 2011.

U.S. Appl. No. 12/478,318, Non-Final Office Action dated Dec. 8, 2010.

Ferrus, R. et al., "Evaluation of a Cell Selection Framework for Radio Access Networks considering Blackhaul Resource Limitations," The 18th Annual IEEE International Symposium on Personal, Indoor and Mobile Radio Communications (PIMRC'07), 2007.

Mino, E. et al., "IST-4-027756 WINNER II, D4.8.3, Integration of Cooperation on WINNER II System Concept," Information Society Technologies, pp. 1-102, Nov. 29, 2007.

Conklin, G. et al., "Video Coding for Streaming Media Delivery on the Internet," IEE Transactions on Circuits and Systems for Video Technology, 11(3):269-281 (Mar. 2001).

International Search Report and Written Opinion from International Application No. PCT/US2007/009296, dated Oct. 17, 2007.

Liu, Xiu et al., "Experiences in a 3G Network: Interplay between the Wireless Channel and Applications," MobiCom'08, pp. 211-222 (Sep. 14-19, 2008).

Yeo, Woon-Yong et al., "Traffic Management of High-Speed CDMA Systems Base on Loan Prediction," IEICE Electronics Express, 6(7):389-394 (Apr. 10, 2009).

3rd Generation Partnership Project 2, "cdma2000 High Rate Packet Data Air Interface," 3GPP2 C.S0024-0, v. 4.0 (Oct. 2002).

3rd Generation Partnership Project 2, "cdma2000 High Rate Packet Data Air Interface," 3GPP2 C.S0024-A, v. 3.0 (Sep. 2006).

* cited by examiner

METHOD FOR INITIATING HANDOFF OF A WIRELESS ACCESS TERMINAL BASED ON THE REVERSE ACTIVITY BIT

FIELD

The disclosed invention relates to wireless networks generally, and to methods for initiating handoffs in wireless networks.

BACKGROUND a. EV-DO Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid wireless access terminals, can communicate with both 1× networks and EV-DO networks.

In the EV-DO context, a mobile station is typically referred to as a wireless access terminal, while the network entity with which the wireless access terminal communicates over the air interface is known as a wireless access node. The wireless access node typically includes a device known as a radio network controller (RNC), which is similar to a base station controller (BSC) in 1× networks. The wireless access node also includes one or more base transceiver stations (BTSs), each of which includes one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, a wireless access terminal may communicate over the packet-data network via the wireless access node and the PDSN.

b. Reverse Noise Rise

Interference can be—and often is—present in a wireless network coverage area. In general, on a given carrier in a given sector of a wireless coverage area, a wireless access node will receive transmissions from wireless access terminals that are operating on that carrier in that sector. However, the wireless access node often also receives transmissions on that carrier from other wireless access terminals, other devices, and/or any other sources of interference on that frequency. At a given moment, the sum total of what a wireless access node is receiving on a given carrier is known as the "reverse noise" on that carrier.

At any time, and in fact quite frequently (e.g., once for every forward-link timeslot (i.e. once every approximately 1.67 ms)), wireless access nodes compute a value known as "reverse noise rise" (RNR), which is the difference between (i) the reverse noise that the wireless access node is currently detecting and (ii) a baseline level of reverse noise. Thus, the wireless access node computes how far the reverse noise has risen above that baseline.

To determine the baseline, EV-DO networks typically periodically utilize what is known as a silent interval, which may occur on the order of once every five minutes, and last on the order of 40-100 ms, both of which are typically configurable. During the silent interval, wireless access terminals know not to transmit anything to the wireless access node. The wireless access node can then measure whatever else is out there. As such, the baseline corresponds to the amount of reverse noise on the carrier in the sector when the sector is unloaded (i.e. without any wireless access terminals). Note that other reverse-link-noise levels could be used as a baseline, other than the unloaded-sector level.

In general, the lower the RNR is at a given moment, the more favorable the RF environment is for communication between wireless access terminals and the wireless access node at that moment. Correspondingly, the higher the RNR, the less favorable the RF environment is. Also, a low RNR generally corresponds to a carrier in a sector being lightly loaded (i.e., supporting communications for a relatively low number of wireless access terminals). In contrast, a high RNR generally corresponds to a carrier in a sector being heavily loaded (i.e., supporting communications for a relatively high number of wireless access terminals).

c. Reverse Activity Bit

Wireless access nodes typically use the calculated value of RNR to, among other things, set what is known as the Reverse Activity Bit (RAB), which is a value that the wireless access node sets to 0 or 1, and repeatedly transmits to all the wireless access terminals operating on a given carrier in a given sector in a wireless coverage area. As stated above, the wireless access node typically calculates RNR at the same frequency at which it transmits forward-link timeslots, or once every 1.67 ms. The wireless access node typically maintains or changes the value of the RAB at this same frequency.

With respect to how the wireless access node chooses to set the RAB to 0 or 1, if the RNR is at or above a reverse-activity threshold, which may be about 5 dB, the wireless access node sets the RAB to 1. If, on the other hand, the RNR is less than the reverse-activity threshold, the wireless access node sets the RAB to 0. The wireless access node then transmits the RAB in a TDM channel—known as the reverse-activity channel—on the forward link. The reverse activity channel is itself a TDM portion of a forward-link channel known as the Media Access Control (MAC) channel. Note that the RAB is the same for all wireless access terminals on a given carrier in a given sector.

SUMMARY

Methods for initiating a handoff in a wireless network are disclosed.

A method according to a first embodiment comprises: (i) determining a value for a reverse activity bit (RAB) for a wireless network coverage area, wherein the wireless network coverage area corresponds to a first wireless access node; and (ii) initiating a handoff of a wireless access terminal based on a set of one or more factors, wherein the set of factors includes the determined value of the RAB.

A method according to a second embodiment comprises: (i) determining a round-trip delay for a bi-directional communications link between a first wireless access node and a wireless access terminal in a wireless network coverage area, wherein the bi-directional communications link comprises a forward link from the first wireless access node to the wireless access terminal and a reverse link from the wireless access terminal to the first wireless access node; (ii) determining a forward-link signal-strength indicator for the forward link; (iii) determining a value for a reverse activity bit (RAB) for the wireless network coverage area; and (iv) initiating a handoff based on the determined value of the RAB and a set of one or more factors, the set including the determined round-trip delay and the determined forward-link signal-strength indicator for the forward link.

A method according to a third embodiment comprises initiating a handoff of a wireless access terminal based on (i) a determined round-trip delay for a bi-directional communications link between a first wireless access node and the wireless access terminal in a wireless network coverage area, wherein the bi-directional communications link comprises a forward link from the first wireless access node to the wireless access terminal and a reverse link from the wireless access terminal to the first wireless access node, (ii) a determined forward-link signal-strength indicator for the forward link, and (iii) a determined value for a reverse activity bit (RAB) for the wireless network coverage area.

These as well as other aspects and advantages will become apparent to those of ordinary skill in the art by reading the following detailed description, with reference where appropriate to the accompanying drawings.

DETAILED DESCRIPTION OF EXEMPLARY EMBODIMENTS

1. Overview

As presently contemplated, a handoff of a wireless access terminal will be initiated based on a determined value for a reverse activity bit (RAB) for the wireless network coverage area, and perhaps also on any one or more of the following factors: (i) a determined round-trip delay for a bi-directional communications link between the first wireless access node and the wireless access terminal in a wireless network coverage area, where the bi-directional communications link comprises a forward-link from the first wireless access node to the wireless access terminal and a reverse link from the wireless access terminal to the first wireless access node, and/or (ii) a determined forward-link signal-strength indicator for the forward-link.

The handoff may be from a first wireless access node to a second wireless access node. For example, the handoff may be from a first frequency associated with the first wireless access node to a second frequency associated with the second wireless access node. The handoff may alternatively be between two frequencies on the same wireless access node. For example, the handoff may be from a first frequency associated with the first wireless access node to a second frequency also associated with the first wireless access node.

2. Exemplary Communication System

Figure 1A:
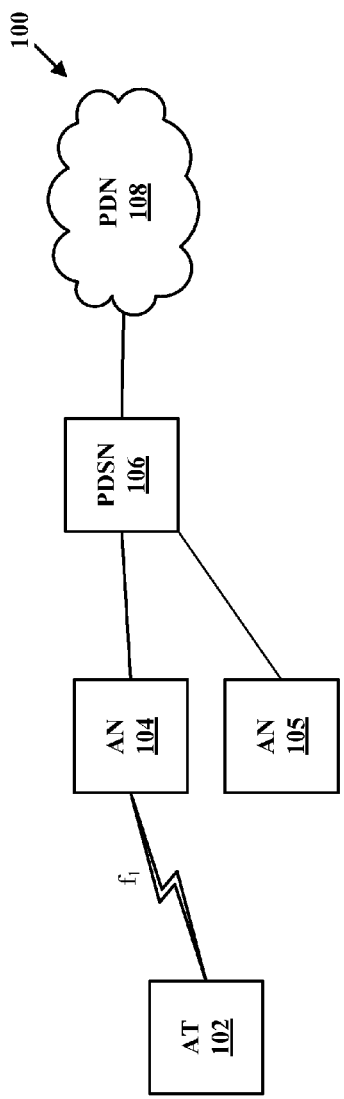
FIGS. 1A, 1B, and 1C are simplified block diagrams of a communication system, in accordance with exemplary embodiments.
Figure 1B:
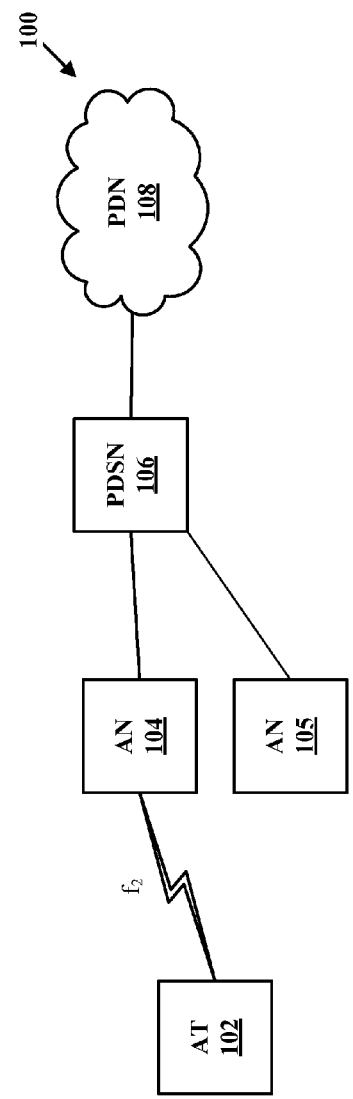
Figure 1C:
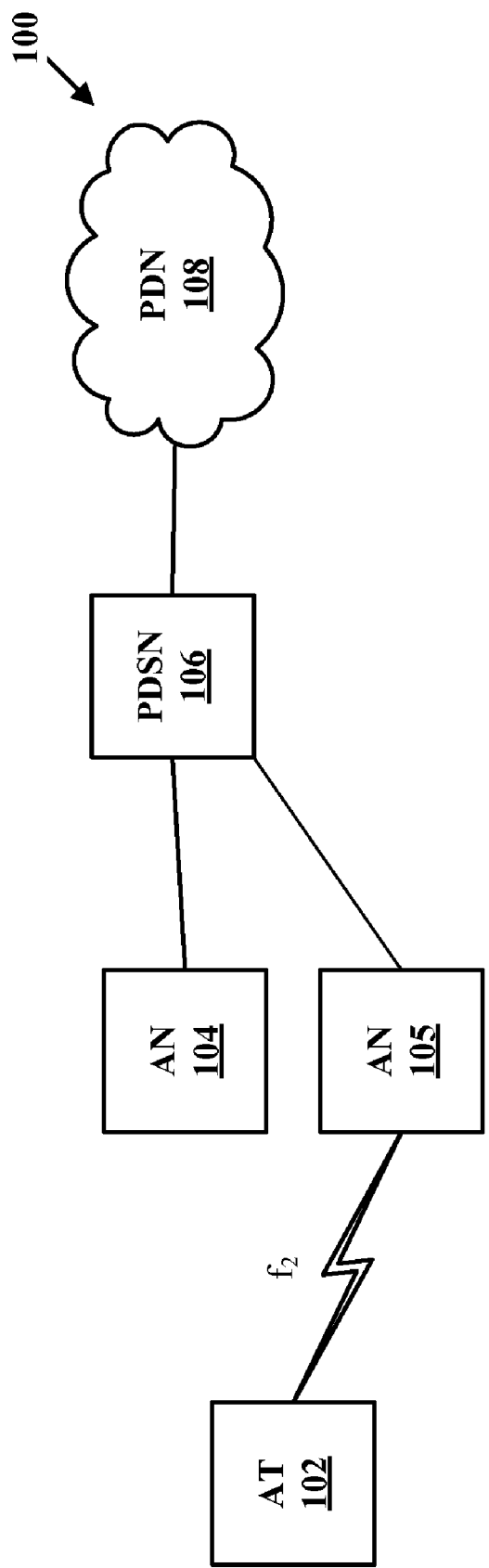

FIGS. 1A, 1B, and 1C show simplified block diagrams of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1A, a communication system 100 includes a wireless access terminal (AT) 102, wireless access nodes (AN) 104 and 105, a PDSN 106, and a packet-data network (PDN) 108. Note that additional entities not depicted in FIG. 1A could be present as well. For example, there could be more than one wireless access terminal in communication with wireless access node 104 and/or 105; furthermore, there could be additional entities in communication with PDN 108. Also, there could be one or more devices and/or networks making up at least part of one or more of the communication links depicted in FIG. 1A. As an example, there could be one or more routers, switches, or other devices or networks on the link between PDSN 106 and PDN 108.

Wireless access terminal 102 may be any mobile device arranged to carry out the wireless-access-terminal functions described herein. As such, wireless access terminal 102 may include a user interface, a wireless-communication interface, a processor, and data storage comprising instructions executable by the processor for carrying out the wireless-access-terminal functions described herein. The user interface may include buttons, a touch-screen, a microphone, and/or any other elements for receiving inputs from users, as well as a speaker, one or more displays, and/or any other elements for communicating outputs to users.

The wireless-communication interface may comprise an antenna and a chipset for communicating with one or more wireless access nodes over an air interface. As an example, the chipset could be one suitable for engaging in EV-DO communications. The chipset or wireless-communication interface in general may also be able to communicate with a CDMA network, a Wi-Fi (IEEE 802.11) network, and/or one or more additional types of wireless networks. The processor and data storage may be any suitable components known to those of skill in the art. As examples, wireless access terminal 102 could be or include a cell phone, a PDA, a computer, a laptop computer, a hybrid IS-2000/IS-856 device, and/or a multi-mode Wi-Fi/cellular device.

Wireless access nodes 104 and 105 may comprise any one or any combination of network elements arranged to carry out the wireless-access-node functions described herein. As such, wireless access nodes 104 and 105 may each include a communication interface, a processor, and data storage comprising instructions executable by the processor to carry out the wireless-access-node functions described herein. The communication interface may include one or more antennas and chipsets or other components for providing one or more EV-DO coverage areas such as cells or sectors, for communicating with wireless access terminals such as wireless access terminal 102 over an air interface. The communication interface may also include a wired packet-data interface such as an Ethernet interface for communicating directly or over one or more networks with PDSN 106. Wireless access nodes 104 and 105 may each include one or more base transceiver stations, as well as one or more radio network controllers.

FIG. 1A shows wireless access node 104 providing service to wireless access terminal 102 over a first frequency, $f_1$. Wireless access node 104 may perform a number of functions related to providing service to wireless access terminal 102 in its corresponding coverage area. For example, wireless access node 104 may measure and/or store data corresponding to a number of wireless-network factors, including any or all of (i) a RAB based at least in part on a measured reverse noise rise (RNR) in the wireless coverage area of wireless access node 104, (ii) a round-trip delay for a bi-directional communications link between wireless access node 104 and wireless access terminal 102, and/or (iii) a forward-link signal-strength indicator for a forward link from wireless access node 104 to wireless access terminal 104. Alternatively, wireless access terminal 102 could measure and/or store data corresponding to any or all the aforementioned wireless-network factors.

In either case, either wireless access node 104 or wireless access terminal 102 may use any or all of the aforementioned wireless-network factors to determine whether to initiate a handoff of wireless access terminal 102. The handoff could between two wireless access nodes. For example, the handoff could be an inter-frequency hard handoff of wireless access terminal 102 from a first wireless frequency associated with wireless access node 104 to a second wireless frequency associated with wireless access node 105. Alternatively, the handoff could be between two frequencies on the same wireless access node. For example, the handoff may be a handoff of wireless access terminal 102 from a first wireless frequency associated with wireless access node 104 to a second wireless frequency associated with wireless access node 104.

For embodiments where wireless access node 104 initiates the handoff, but wireless access terminal 102 determines one or more of the wireless-network factors, wireless access terminal 102 can simply send the one or more factors to wireless access node 104 for initiating the handoff. Likewise, for embodiments where wireless access terminal 102 initiates the handoff, but wireless access node 104 determines one or more of the factors, wireless access node 104 can simply send the one or more factors to wireless access terminal 102 for initiating the handoff.

In one embodiment, wireless access node 104 may initiate a handoff of wireless access terminal 102 from a first wireless frequency, $f_1$, associated with wireless access node 104 to a second wireless frequency, $f_2$, associated with wireless access node 104. In this embodiment, wireless access node 104 may initiate the handoff based on a set of one or more factors that includes the RAB for the wireless coverage area of wireless access node 104 in which wireless access terminal 102 is located. The set of one or more factors may also include either or both of (i) the measured round-trip delay of the bi-directional communications link between wireless access terminal 102 and wireless access node 104, and/or (ii) the forward-link signal-strength indicator for the forward link from wireless access node 104 to wireless access terminal 102. The completion of the handoff of wireless access terminal 102 from wireless frequency $f_1$ associated with wireless access node 104 to wireless frequency $f_2$ associated with wireless access node 104 results in the configuration shown in FIG. 1B.

In an alternative embodiment, wireless access terminal 102 may initiate the handoff from a first wireless frequency, $f_1$, associated with wireless access node 104 to a second wireless frequency, $f_2$, associated with wireless access node 104. In this embodiment, wireless access terminal 102 may initiate the handoff based on a set of one or more factors that includes the RAB for the wireless coverage area of wireless access node 104 in which wireless access terminal 102 is located. The set of one or more factors may also include either or both of (i) the measured round-trip delay of the bi-directional communications link between wireless access terminal 102 and wireless access node 104, and/or (ii) the forward-link signal-strength indicator for the forward link from wireless access node 104 to wireless access terminal 102. The completion of the handoff of wireless access terminal 102 from wireless frequency $f_1$ associated with wireless access node 104 to wireless frequency $f_2$ associated with wireless access node 104 results in the configuration shown in FIG. 1B.

In another alternative embodiment, wireless access node 104 may initiate a handoff of wireless access terminal 102 from a first wireless frequency, $f_1$, associated with wireless access node 104 to a second wireless frequency, $f_2$, associated with wireless access node 105. In this embodiment, wireless access node 104 may initiate the handoff based on a set of one or more factors that includes the RAB for the wireless coverage area of wireless access node 104 in which wireless access terminal 102 is located. The set of one or more factors may also include either or both of (i) the measured round-trip delay of the bi-directional communications link between wireless access terminal 102 and wireless access node 104, and/or (ii) the forward-link signal-strength indicator for the forward link from wireless access node 104 to wireless access terminal 102. The completion of the handoff of wireless access terminal 102 from wireless frequency $f_1$ associated with wireless access node 104 to wireless frequency $f_2$ associated with wireless access node 105 results in the configuration shown in FIG. 1C.

In yet another alternative embodiment, wireless access terminal 102 may initiate the handoff from a first wireless frequency, $f_1$, associated with wireless access node 104 to a second wireless frequency, $f_2$, associated with wireless access node 105. In this embodiment, wireless access terminal 102 may initiate the handoff based on a set of one or more factors that includes the RAB for the wireless coverage area of wireless access node 104 in which wireless access terminal 102 is located. The set of one or more factors may also include either or both of (i) the measured round-trip delay of the bi-directional communications link between wireless access terminal 102 and wireless access node 104, and/or (ii) the forward-link signal-strength indicator for the forward link from wireless access node 104 to wireless access terminal 102. The completion of the handoff of wireless access terminal 102 from wireless frequency $f_1$ associated with wireless access node 104 to wireless frequency $f_2$ associated with wireless access node 105 results in the configuration shown in FIG. 1C.

3. Exemplary Methods

Figure 2:
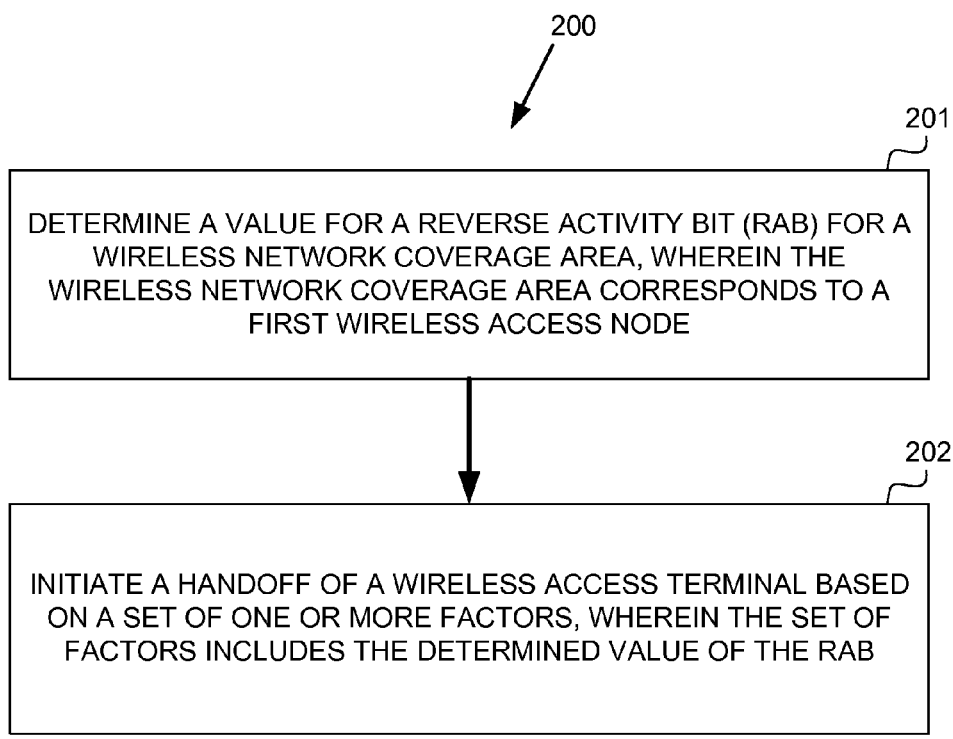
FIG. 2 is a flowchart of a method according to a first exemplary embodiment.

FIG. 2 shows a method 200 according to a first exemplary embodiment. As shown in FIG. 2, method 200 begins at step 201, by determining a value for a reverse activity bit (RAB) for a wireless network coverage area, wherein the wireless network coverage area corresponds to a first wireless access node. Then, method 200 proceeds to step 201 by initiating a handoff of a wireless access terminal based on a set of one or more factors, wherein the set of factors includes the determined value of the RAB. In one embodiment of method 200, the wireless access terminal may initiate the handoff at step 202, but in another embodiment, the wireless access node may initiate the handoff at step 202.

The handoff may be a handoff from the first wireless access node to a second wireless access node. For example, the handoff may be an inter-frequency hard handoff from a first frequency to a second frequency, wherein the first frequency is associated with the first wireless access node, and wherein the second frequency is associated with a second wireless access node. Alternatively, the handoff may be a handoff between two frequencies on the same wireless access node. For example, the handoff may be an inter-frequency hard handoff from a first frequency to a second frequency, wherein the first frequency and the second frequency are associated with the first wireless access node.

In one embodiment of method 200, the determined value of the RAB is equal to zero when measured reverse noise rise (RNR) for the wireless network coverage area is less than a defined RNR threshold, and the determined value of the RAB is equal to one when measured RNR for the wireless network coverage area is equal to or greater than the defined RNR threshold.

In another embodiment of method 200, the set of one or more factors may further include a determined round-trip delay for a bi-directional communications link between the first wireless access node and the wireless access terminal, wherein the bi-directional communications link comprises a forward link from the first wireless access node to the wireless access terminal and a reverse link from the wireless access terminal to the first wireless access node.

The round-trip delay could be measured by a wireless access terminal, but the round-trip delay could alternatively be measured by the wireless access node. For an exemplary embodiment where the wireless access terminal measures the round-trip delay, but the wireless access node initiates the handoff at step 202, the wireless access terminal can simply send the measured round-trip delay to the wireless access node for use in initiating the handoff. Similarly, for an exemplary embodiment where the wireless access node measures the round-trip delay, but the wireless access terminal initiates the handoff at step 202, the wireless access node can simply send the measured round-trip delay to the wireless access terminal for use in initiating the handoff. In either case, method 200 may further comprise initiating the handoff when (i) the determined value of the RAB is equal to one for a defined period of time, and (ii) the determined round-trip delay exceeds a minimum round-trip delay threshold value.

In yet another embodiment of method 200, the set of one or more factors may further include a determined forward-link signal-strength indicator for a forward link from the first wireless access node to the wireless access terminal. The forward-link signal-strength indicator could be determined by a wireless access terminal, but the forward-link signal-strength indicator could alternatively be determined by the wireless access node. For an exemplary embodiment where the wireless access terminal determines the forward-link signal-strength indicator, but the wireless access node initiates the handoff at step 202, the wireless access terminal can simply send the forward-link signal-strength indicator to the wireless access node for initiating the handoff. Similarly, for an exemplary embodiment where the wireless access node determines the forward-link signal-strength indicator, but the wireless access terminal initiates the handoff at step 202, the wireless access node can simply send the forward-link signal-strength indicator to the wireless access terminal for use in initiating the handoff. In either case, method 200 may further comprise initiating the handoff when (i) the determined value of the RAB is equal to one for a defined period of time, and (ii) the determined forward-link signal-strength indicator is less than a first signal-strength threshold value.

In still another embodiment of method 200, the set of one or more factors may further include (i) a determined round-trip delay for a bi-directional communications link between the first wireless access node and the wireless access terminal, wherein the bi-directional communications link comprises a forward link from the first wireless access node to the wireless access terminal and a reverse link from the wireless access terminal to the first wireless access node, and (ii) a determined forward-link signal-strength indicator for the forward link.

Either or both of the round-trip delay and/or the forward-link signal-strength indicator could be determined by a wireless access terminal, but either or both of the round-trip delay and/or the forward-link signal-strength indicator could alternatively be determined by the wireless access node. For an exemplary embodiment where the wireless access terminal determines either or both of the round-trip delay and/or the forward-link signal-strength indicator, but the wireless access node initiates the handoff at step 202, the wireless access terminal can simply send either or both of the round-trip delay and/or the forward-link signal-strength indicator to the wireless access node for initiating the handoff. Similarly, for an exemplary embodiment where the wireless access node determines either or both of the round-trip delay and/or the forward-link signal-strength indicator, but the wireless access terminal initiates the handoff at step 202, the wireless access node can simply send either or both of the round-trip delay and/or the forward-link signal-strength indicator to the wireless access terminal for initiating the handoff. In either case, method 200 may further comprise initiating the handoff when (i) the determined value of the RAB is equal to one for a defined period of time and (ii) (a) the determined round-trip delay exceeds a minimum round-trip delay threshold value and/or (b) the determined forward-link signal-strength indicator is less than a first signal-strength threshold value.

Figure 3:
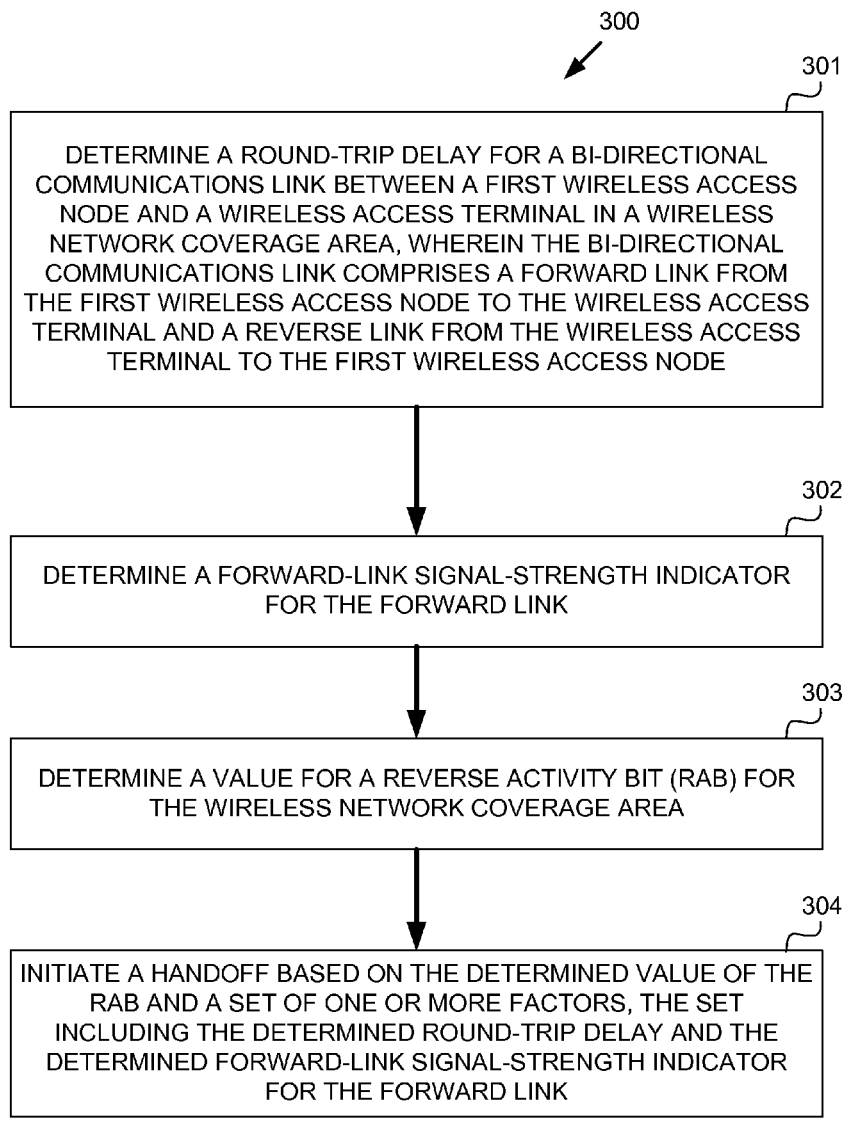
FIG. 3 is a flowchart of a method according to a second exemplary embodiment.

FIG. 3 shows a method 300 according to a second exemplary embodiment. As shown in FIG. 3, method 300 begins at step 301, by determining a round-trip delay for a bi-directional communications link between a first wireless access node and a wireless access terminal in a wireless network coverage area, wherein the bi-directional communications link comprises a forward link from the first wireless access node to the wireless access terminal and a reverse link from the wireless access terminal to the first wireless access node. Then, at step 302, method 300 continues by determining a forward-link signal-strength indicator for the forward link. At step 303, method 300 continues by determining a value for a reverse activity bit (RAB) for the wireless network coverage area. And then, at step 304, method 300 continues by initiating a handoff based on the determined value of the RAB and a set of one or more factors, the set including the determined round-trip delay and the determined forward-link signal-strength indicator for the forward link. In one embodiment of method 300, the wireless access terminal may initiate the handoff at step 304, but in another embodiment, the wireless access node may initiate the handoff at step 304.

The handoff may be a handoff from the first wireless access node to a second wireless access node. For example, the handoff may be an inter-frequency hard handoff from a first frequency to a second frequency, wherein the first frequency is associated with the first wireless access node, and wherein the second frequency is associated with a second wireless access node. Alternatively, the handoff may be a handoff between two frequencies on the same wireless access node. For example, the handoff may be an inter-frequency hard handoff from a first frequency to a second frequency, wherein the first frequency and the second frequency are associated with the first wireless access node.

In one embodiment of method 300, the determined value of the RAB at step 303 is equal to zero when measured reverse noise rise (RNR) for the wireless network coverage area is less than a defined RNR threshold, and the determined value of the RAB is equal to one when measured RNR for the wireless network coverage area is equal to or greater than the defined RNR threshold.

As stated above, method 300 comprises step 304 of initiating a handoff based on the determined value of the RAB and a set of one or more factors, the set including the determined round-trip delay and the determined forward-link signal-strength indicator for the forward link. In one embodiment, method 300 may further comprise initiating the handoff when (i) the determined value of the RAB is equal to one for a defined period of time and (ii) (a) the determined round-trip delay exceeds a minimum round-trip delay threshold value and/or (b) the determined forward-link signal-strength indicator is less than a first signal-strength threshold value. In another embodiment, method 300 may further comprise initiating the handoff when (i) the determined round-trip delay exceeds a minimum round-trip delay threshold, (ii) the determined signal-strength indicator is less than a first signal-strength threshold value, and (iii) the determined value of the RAB is equal to one for a defined period of time. In yet another embodiment, method 300 may further comprise initiating the handoff when (i) the determined round-trip delay exceeds a maximum round-trip delay threshold value, (ii) the determined forward-link signal-strength indicator is less than a second signal-strength threshold value, and (iii) the determined value of the RAB is equal to one. In still another embodiment, method 300 may further comprise initiating the handoff when (i) the determined round-trip delay exceeds a maximum round-trip delay threshold value, or (ii) the determined signal-strength indicator is less than a second signal-strength threshold value, or (iii) the determined value of the RAB is equal to one for a defined period of time.

Figure 4:
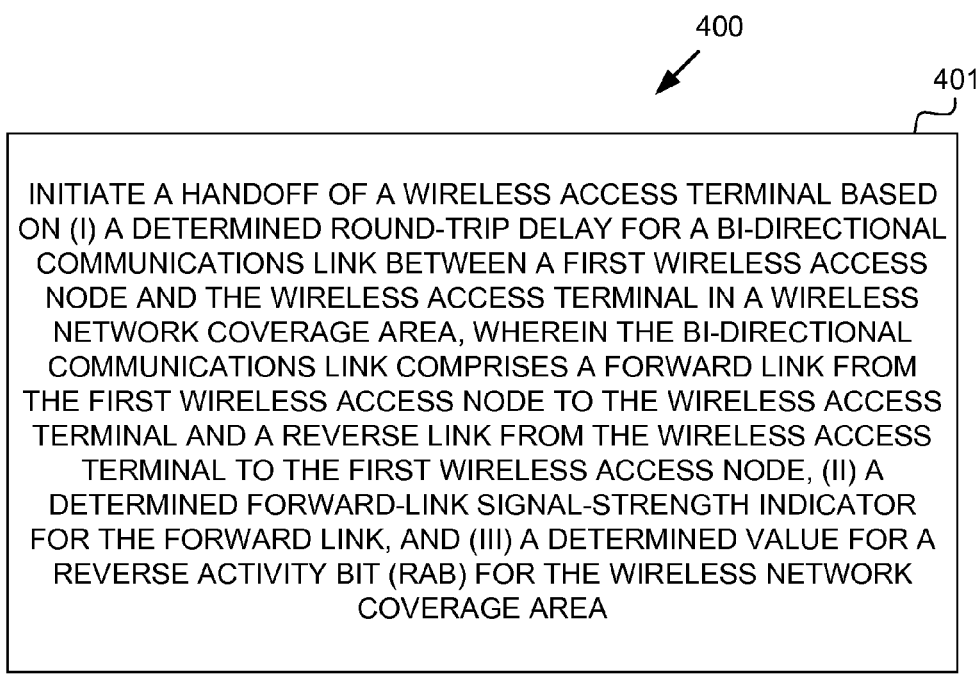
FIG. 4 is a flowchart of a method according to a third exemplary embodiment.

FIG. 4 is a flowchart of a method 400 according to a third exemplary embodiment. Method 400 comprises step 401 of initiating a handoff of a wireless access terminal based on (i) a determined round-trip delay for a bi-directional communications link between a first wireless access node and the wireless access terminal in a wireless network coverage area, wherein the bi-directional communications link comprises a forward link from the first wireless access node to the wireless access terminal and a reverse link from the wireless access terminal to the first wireless access node, (ii) a determined forward-link signal-strength indicator for the forward link, and (iii) a determined value for a reverse activity bit (RAB) for the wireless network coverage area. In one embodiment of method 400, the wireless access terminal initiates the handoff at step 401. In an alternative embodiment, the wireless access node initiates the handoff at step 401.

The handoff may be a handoff from the first wireless access node to a second wireless access node. For example, the handoff may be an inter-frequency hard handoff from a first frequency to a second frequency, wherein the first frequency is associated with the first wireless access node, and wherein the second frequency is associated with a second wireless access node. Alternatively, the handoff may be a handoff between two frequencies on the same wireless access node. For example, the handoff may be an inter-frequency hard handoff from a first frequency to a second frequency, wherein the first frequency and the second frequency are associated with the first wireless access node.

In one embodiment of method 400, the determined value of the RAB is equal to zero when measured reverse noise rise (RNR) for the wireless network coverage area is less than a defined RNR threshold, and the determined value of the RAB is equal to one when measured RNR for the wireless network coverage area is equal to or greater than the defined RNR threshold. In one embodiment, method 400 further comprises initiating the handoff when (i) the determined value of the RAB is equal to one and (ii) (a) the determined round-trip delay exceeds a minimum round-trip delay threshold value and/or (b) the determined signal-strength indicator is less than a first signal-strength threshold value.

4. Conclusions

Various exemplary embodiments have been described above. Those skilled in the art will understand, however, that changes and modifications may be made to those examples without departing from the scope of the claims.

We claim:

1. A method comprising:
   determining a value for a reverse activity bit (RAB) for a wireless network coverage area, wherein the wireless network coverage area corresponds to a first wireless access node;
   determining a round-trip delay for a bi-directional communications link between the first wireless access node and a wireless access terminal, wherein the bi-directional communications link comprises a forward link from the first wireless access node to the wireless access terminal and a reverse link from the wireless access terminal to the first wireless access node; and
   initiating a handoff of a wireless access terminal when (i) the determined value of the RAB is equal to one for a defined period of time, and (ii) the determined round-trip delay exceeds a minimum round-trip delay threshold value.

2. The method of claim 1 wherein the handoff is an inter-frequency hard handoff from a first frequency to a second frequency, wherein the first frequency and the second frequency are associated with the first wireless access node.

3. The method of claim 1 wherein the handoff is an inter-frequency hard handoff from a first frequency to a second frequency, wherein the first frequency is associated with the first wireless access node, and wherein the second frequency is associated with a second wireless access node.

4. The method of claim 1 wherein the handoff is a handoff from the first wireless access node to a second wireless access node.

5. The method of claim 1, wherein the determined value of the RAB is equal to zero when measured reverse noise rise (RNR) for the wireless network coverage area is less than a defined RNR threshold, and the determined value of the RAB is equal to one when measured RNR for the wireless network coverage area is equal to or greater than the defined RNR threshold.

6. The method of claim 1, further comprising:
   determining a forward-link signal-strength indicator for a forward link from the first wireless access node to the wireless access terminal, and wherein initiating the handoff of the wireless access terminal further comprises:

initiating the handoff when (i) the determined value of the RAB is equal to one for a defined period of time, (ii) the determined forward-link signal-strength indicator is less than a first signal-strength threshold value, and (iii) the determined round-trip delay exceeds a minimum round-trip delay threshold value.

7. The method of claim 1, wherein the first wireless access node initiates the handoff.

8. The method of claim 1, wherein the wireless access terminal initiates the handoff.

9. A method comprising:
determining a round-trip delay for a bi-directional communications link between a first wireless access node and a wireless access terminal in a wireless network coverage area, wherein the bi-directional communications link comprises a forward link from the first wireless access node to the wireless access terminal and a reverse link from the wireless access terminal to the first wireless access node;
determining a forward-link signal-strength indicator for the forward link;
determining a value for a reverse activity bit (RAB) for the wireless network coverage area; and
initiating a handoff based on the determined value of the RAB and a set of one or more factors, the set including the determined round-trip delay and the determined forward-link signal-strength indicator for the forward link.

10. The method of claim 9 wherein the handoff is an inter-frequency hard handoff from a first frequency to a second frequency, wherein the first frequency and the second frequency are associated with the first wireless access node.

11. The method of claim 9 wherein the handoff is an inter-frequency hard handoff from a first frequency to a second frequency, wherein the first frequency is associated with the first wireless access node, and wherein the second frequency is associated with a second wireless access node.

12. The method of claim 9 wherein the handoff is a handoff from the first wireless access node to a second wireless access node.

13. The method of claim 9, wherein the determined value of the RAB is equal to zero when measured reverse noise rise (RNR) for the wireless network coverage area is less than a defined RNR threshold, and the determined value of the RAB is equal to one when measured RNR for the wireless network coverage area is equal to or greater than the defined RNR threshold.

14. The method of claim 9, further comprising:
initiating the handoff when (i) the determined value of the RAB is equal to one for a defined period of time and (ii) (a) the determined round-trip delay exceeds a minimum round-trip delay threshold value and/or (b) the determined forward-link signal-strength indicator is less than a first signal-strength threshold value.

15. The method of claim 9, further comprising:
initiating the handoff when (i) the determined round-trip delay exceeds a minimum round-trip delay threshold, (ii) the determined signal-strength indicator is less than a first signal-strength threshold value, and (iii) the determined value of the RAB is equal to one for a defined period of time.

16. The method of claim 9, further comprising:
initiating the handoff when (i) the determined round-trip delay exceeds a maximum round-trip delay threshold value, (ii) the determined forward-link signal-strength indicator is less than a second signal-strength threshold value, and (iii) the determined value of the RAB is equal to one.

17. The method of claim 9, further comprising:
initiating the handoff when (i) the determined round-trip delay exceeds a maximum round-trip delay threshold value, or (ii) the determined signal-strength indicator is less than a second signal-strength threshold value, or (iii) the determined value of the RAB is equal to one for a defined period of time.

18. A method comprising:
initiating a handoff of a wireless access terminal based on (i) a determined round-trip delay for a bi-directional communications link between a first wireless access node and the wireless access terminal in a wireless network coverage area, wherein the bi-directional communications link comprises a forward link from the first wireless access node to the wireless access terminal and a reverse link from the wireless access terminal to the first wireless access node, (ii) a determined forward-link signal-strength indicator for the forward link, and (iii) a determined value for a reverse activity bit (RAB) for the wireless network coverage area.

19. The method of claim 18 wherein the handoff is an inter-frequency hard handoff from a first frequency to a second frequency, wherein the first frequency and the second frequency are associated with the first wireless access node.

20. The method of claim 18 wherein the handoff is an inter-frequency hard handoff from a first frequency to a second frequency, wherein the first frequency is associated with the first wireless access node, and wherein the second frequency is associated with a second wireless access node.

21. The method of claim 18 wherein the handoff is a handoff from the first wireless access node to a second wireless access node.

22. The method of claim 18, wherein the determined value of the RAB is equal to zero when measured reverse noise rise (RNR) for the wireless network coverage area is less than a defined RNR threshold, and the determined value of the RAB is equal to one when measured RNR for the wireless network coverage area is equal to or greater than the defined RNR threshold.

23. The method of claim 18, further comprising:
initiating the handoff when (i) the determined value of the RAB is equal to one and (ii) (a) the determined round-trip delay exceeds a minimum round-trip delay threshold value and/or (b) the determined signal-strength indicator is less than a first signal-strength threshold value.

24. The method of claim 18, wherein initiating the handoff is performed by one of either the wireless access terminal or the first wireless access node.

* * * * *